United States Patent
Pawlowski

(10) Patent No.: US 11,467,979 B2
(45) Date of Patent: Oct. 11, 2022

(54) METHODS FOR SUPPORTING MISMATCHED TRANSACTION GRANULARITIES

(71) Applicant: Micron Technology, Inc., Boise, ID (US)

(72) Inventor: Joseph T. Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/393,006

(22) Filed: Aug. 3, 2021

(65) Prior Publication Data

US 2022/0027286 A1    Jan. 27, 2022

Related U.S. Application Data

(63) Continuation of application No. 16/555,976, filed on Aug. 29, 2019, now Pat. No. 11,086,791.

(51) Int. Cl.
| | |
|---|---|
| *G06F 12/12* | (2016.01) |
| *G06F 11/10* | (2006.01) |
| *G06F 12/0866* | (2016.01) |
| *G06F 12/123* | (2016.01) |

(52) U.S. Cl.
CPC .......... *G06F 12/12* (2013.01); *G06F 11/1004* (2013.01); *G06F 12/0866* (2013.01); *G06F 12/123* (2013.01); *G06F 2212/608* (2013.01)

(58) Field of Classification Search
CPC ............... G06F 12/12; G06F 11/1004; G06F 2212/608; G06F 12/0866; G06F 12/123
USPC ........ 714/807, 763, 766, 768, 799; 711/122, 711/118, 133, 130
See application file for complete search history.

(56) References Cited

U.S. PATENT DOCUMENTS

| | | | | |
|---|---|---|---|---|
| 5,526,510 A | * | 6/1996 | Akkary | G06F 12/0831 711/143 |
| 6,766,419 B1 | * | 7/2004 | Zahir | G06F 9/30047 711/119 |
| 8,024,522 B1 | * | 9/2011 | Favor | G06F 9/3004 711/146 |

(Continued)

OTHER PUBLICATIONS

Chen et al., Eviction Based Cache Placement for Storage Caches, 2003, USENIX, pp. 269-281. (Year: 2003).

(Continued)

*Primary Examiner* — John J Tabone, Jr.
(74) *Attorney, Agent, or Firm* — Holland & Hart LLP

(57) ABSTRACT

Methods, systems, and devices for methods for supporting mismatched transaction granularities are described. A memory system may include a host device the performs data transactions according to a first code word size that is different than a second code word size associated with a storage component within the memory system. A cache may be configured to receive, from the host device, a first code word associated of the first code word size and associated with a first address of the storage component. The cache may store the first code word. When the first code word is evicted from the cache, the memory system may generate a third code word of the second size based on the first code word and a second code word stored in the first address of the storage component and store the third code word at the first address of the storage component.

20 Claims, 7 Drawing Sheets

(56) References Cited

U.S. PATENT DOCUMENTS

| | | | | |
|---|---|---|---|---|
| 8,051,247 B1* | 11/2011 | Favor | | G06F 9/3851 |
| | | | | 711/146 |
| 8,117,395 B1* | 2/2012 | Rohana | | G06F 12/0864 |
| | | | | 711/128 |
| 8,370,576 B1* | 2/2013 | Favor | | G06F 12/0855 |
| | | | | 711/146 |
| 8,370,609 B1* | 2/2013 | Favor | | G06F 9/3834 |
| | | | | 712/225 |
| 9,092,337 B2* | 7/2015 | Nellans | | G06F 3/0655 |
| 9,189,414 B1* | 11/2015 | Shim | | G06F 13/12 |
| 9,740,623 B2* | 8/2017 | Hughes | | G06F 12/0891 |
| 10,115,444 B1* | 10/2018 | Shin | | G11C 11/1655 |
| 11,086,791 B2* | 8/2021 | Pawlowski | | G06F 11/1004 |
| 2003/0188105 A1* | 10/2003 | Middleton | | G06F 12/0864 |
| | | | | 711/E12.047 |
| 2009/0100231 A1* | 4/2009 | Okabayashi | | G06F 12/12 |
| | | | | 711/143 |
| 2012/0198170 A1* | 8/2012 | Chen | | G06F 9/3806 |
| | | | | 711/125 |
| 2012/0198174 A1* | 8/2012 | Nellans | | G06F 3/0655 |
| | | | | 711/E12.009 |
| 2012/0260041 A1* | 10/2012 | Habusha | | G06F 12/0864 |
| | | | | 711/E12.024 |
| 2013/0103930 A1* | 4/2013 | Horikawa | | G06F 9/3004 |
| | | | | 712/216 |
| 2014/0337682 A1* | 11/2014 | Prodan | | H03M 13/116 |
| | | | | 714/755 |
| 2015/0052310 A1 | 2/2015 | Kim et al. | | |
| 2015/0127905 A1 | 5/2015 | Chang et al. | | |
| 2015/0169458 A1 | 6/2015 | Purkayastha et al. | | |
| 2015/0309933 A1* | 10/2015 | Nellans | | G06F 12/0804 |
| | | | | 711/103 |
| 2016/0044143 A1* | 2/2016 | Narasimhamurthy | .. | H04L 69/16 |
| | | | | 709/213 |
| 2017/0286294 A1 | 10/2017 | Trika et al. | | |
| 2018/0293175 A1 | 10/2018 | Chang et al. | | |
| 2018/0322053 A1* | 11/2018 | Hagersten | | G06F 12/0811 |
| 2019/0236018 A1* | 8/2019 | Kass | | G06F 12/0891 |
| 2020/0004662 A1* | 1/2020 | Mola | | G06F 11/3037 |
| 2020/0026664 A1 | 1/2020 | Jeong et al. | | |
| 2020/0081771 A1* | 3/2020 | Kalamatianos | | G06F 11/1064 |
| 2020/0250090 A1* | 8/2020 | Ware | | G06F 12/0246 |
| 2020/0285550 A1* | 9/2020 | Vrabel | | G06F 11/1064 |
| 2021/0064540 A1* | 3/2021 | Pawlowski | | G06F 11/1004 |
| 2022/0027286 A1* | 1/2022 | Pawlowski | | G06F 11/1004 |

OTHER PUBLICATIONS

Hu et al., Kinetic Modeling of Data Eviction in Cache, 2016, USENIX Association, pp. 351-364. (Year: 2016).

International Search Report and Written Opinion received for PCT Patent Application No. PCT/US20/47000, dated Nov. 30, 2020, 9 pages.

* cited by examiner

METHODS FOR SUPPORTING MISMATCHED TRANSACTION GRANULARITIES

CROSS REFERENCE

The present application for patent is a continuation of U.S. patent application Ser. No. 16/555,976 by Pawlowski, entitled "METHODS FOR SUPPORTING MISMATCHED TRANSACTION GRANULARITIES," filed Aug. 29, 2019, assigned to the assignee hereof, and is expressly incorporated by reference in its entirety herein.

BACKGROUND

The following relates generally to a system that includes at least one memory device and more specifically to methods for supporting mismatched transaction granularities.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

Improving a system may include enhancing a memory subsystem's performance such as reducing power consumption, increasing memory capacity, improving read/write speeds, providing non-volatility by use of persistent memory media, or reducing manufacturing costs at a certain performance point, among other metrics. Some types of memory may have limits regarding a number of access operations (e.g., write operations and/or read operations) that may be performed on each cell without degradation in memory performance. In addition, some patterns of memory accesses may frequency access certain regions of memory, including some that may intentionally try to disrupt the stored memory states. Thus, maintaining memory performance under various conditions, including the presence of malicious actors, may provide challenges.

DETAILED DESCRIPTION

Figure 1:
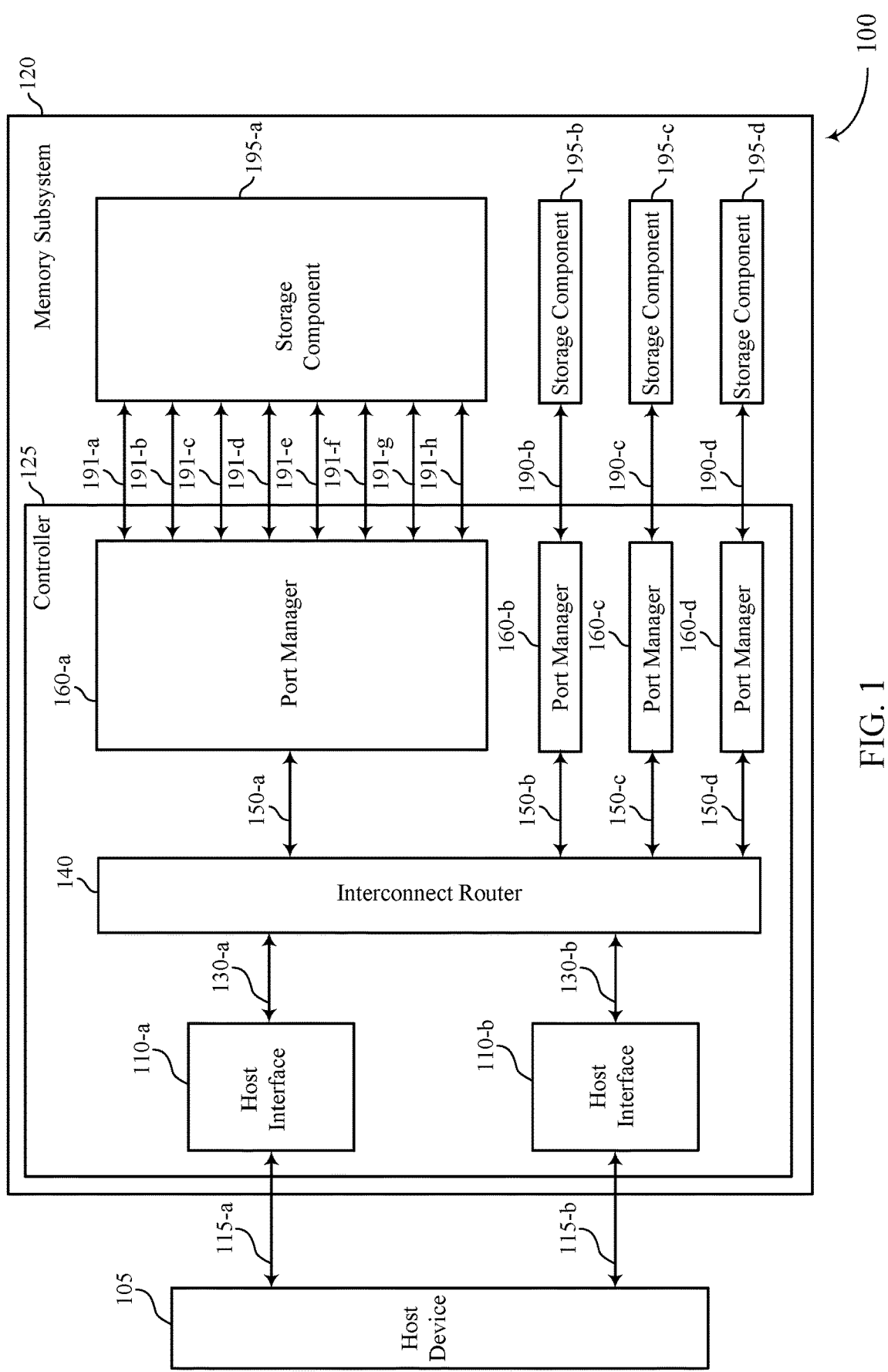
FIG. 1 illustrates an example of a system that supports mismatched transaction granularities in accordance with examples as disclosed herein.

A storage component (e.g., a memory device, memory media) of a memory system may perform data transactions according to a code word size that is based on various characteristics of the storage device. In some cases, a host device may perform data transactions according to a code word size different than the code word size of the storage component. For example, the size of a code word stored at the storage component may be a multiple of the size of a code word used by the host device. The memory system may employ cache memory to enable data transactions between the host device and the storage device despite the mismatched transaction granularities (e.g., the differing code word sizes). Each cache address may be configured to store code words according to a code word size used by the storage component. While each cache address may correspond to a single storage component address, each cache address may further be configured to store code words from the host device within a portion of the memory associated with the cache address.

The cache memory may further reduce a quantity of accesses associated with the storage component. That is, memory cells of a storage component may wear-out or stop reliably storing a memory state when the quantity of access operations (e.g., reads, writes, etc.) to those cells surpassing a wear threshold. In some cases, one or more memory cells may be subjected to a higher concentration of access operations, for example, due to normal operations of a storage component or a malicious attack. Accordingly, some memory cells may wear-out before other, less accessed, memory cells of a memory array. As such, logic states stored at those cells may become corrupted, or if identified, a storage component may need to dedicate resources to correcting errors or storing data associated with worn out memory cells.

When a host device issues an access command, the memory system may determine if data associated with an address indicated by the access command is included within the cache memory. In a case that the memory system determines that the cache includes valid data associated with the storage component (e.g., a cache hit), the memory system may execute the access command at the cache. Alternatively, the memory system may determine that the cache does not include valid data at the cache (e.g., a cache miss). In the case of a cache miss for a write command from the host device, the memory system may determine an address within the cache to store data associated with the address indicated by the write command. If the cache is full, the memory system may determine to evict data from an address of the cache. In some cases, the memory system may maintain an address pointer indicating an address to evict. The memory system may determine to evict either the address indicated by the address pointer or one or more sequential addresses to the address indicated by the address pointer. The memory system may determine which cache address to evict (e.g., the cache address indicated by the pointer, a sequential cache address) based on a quantity of accesses associated with each address.

Features of the disclosure are initially described in the context of a system as described with reference to FIG. 1. Features of the disclosure are further described in the context of memory subsystems and a process flow as described with reference to FIGS. 2-4. These and other features of the disclosure are further illustrated by and described with reference to an apparatus diagram and flowcharts that relate to fully associative cache management as described with references to FIGS. 5-7.

FIG. 1 illustrates an example of a system 100 that supports mismatched transaction granularities in accordance with examples as disclosed herein. The system 100 may include a host device 105 coupled with a memory subsystem 120 using host links 115. The memory subsystem 120 may include a controller 125 and storage components 195, which may be examples of various memory devices or storage components. The controller 125 may include host interfaces 110, an interconnect router 140, port managers 160, and storage component 195, which may be examples of various memory devices and storage components. The components within the memory subsystem 120 may be in electronic communication with one another by one or more busses.

The host device 105 may be a server, a system on a chip (SoC), a central processing unit (CPU). or a graphics processing unit (GPU). The host device 105 may access (e.g., read from, write to) one or more storage component 195 located in the memory subsystem 120 through the host links 115. The host links 115 may employ a protocol (e.g., the Gen-Z, the cache coherent interconnect for accelerators (CCIX) protocol). The host links 115 may be configured to transfer data at a data transfer rate. For example, the host link 115 may be configured to transfer data at a data transfer rate (e.g., 25 gigabytes per second (GBps)) each direction (e.g., sending or receiving) through the host link 115. In some examples, a 25 GBps data transfer rate may support 586 million transactions per second when a transaction is 64 bytes. In other examples, a 25 GBps data transfer rate may support 112.5 million transactions per second when a transaction is 128 bytes. More than one host link 115 may increase the data transfer rate between the host device 105 and the memory subsystem 120. For example, the memory subsystem 120 may be configured to transfer data at a data transfer rate of 100 GBps due to the two host links 115-a and 115-b, which may each be configured to transfer data at 50 GBps.

The system 100 may include the memory subsystem 120. The memory subsystem 120 may be a memory component, computing device, electronic device, mobile computing device, or wireless device. For example, the memory subsystem 120 may be a portable electronic device such as a computer, a laptop computer, a tablet computer, a smartphone, a cellular phone, a wearable device, an internet-connected device, or the like. In some cases, the memory subsystem 120 may be configured for bi-directional wireless communication with or via a base station or access point. The memory subsystem 120 may be referred to as a memory device or memory devices.

The memory subsystem 120 may include a controller 125 and storage component 195. In some examples, the controller 125 and the storage component 195 may be integrated with, in contact with, or placed on a board (e.g., a peripheral component interconnect express (PCIe) board). The controller 125 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

The controller 125 may be configured to interface with the host device 105 and the storage component 195. The controller 125 may receive, from the host device 105, a first access command for the storage component 195. For example, the controller 125 may receive a first access command indicating to read data from or write data to the storage component 195. The controller 125 may generate a second access command for execution at the storage component 195 based on the first access command. For example, the host device 105 may be operable to perform access operations according to a first code word size (e.g., 64 bytes) while the storage component 195 may be operable to perform access operations according to a second code word size (e.g., 128 bytes). A code word may be the smallest unit of data that the host device 105 or the storage component 195 may control (e.g., a granularity of data transactions). Here, the first access command may indicate an access operation based on a 64 byte code word while the second access command may indicate the same access operation but based on a 128 byte code word. In another example, the controller 125 may be operable to distribute access operations across the storage component 195 to control a wear level associated with a part of the storage component 195. That is, sequential logical addresses at the host device 105 may be interleaved across more than one storage component 195. Here, the first access command may indicate an access operation based on one or more sequential addresses at the host device 105, while the second access command may indicate an access operation on non-sequential addresses within the storage component 195. In some cases, the non-sequential addresses may be associated with different storage component 195 (e.g., storage component 195-a, storage component 195-b). As a result, the memory subsystem 120 may execute an access operation corresponding to logical addresses in parallel. For example, port manager 160-a may facilitate an execution of a portion of the access operation on a first subset of the logical addresses within the storage component 195-a while port manager 160-b facilitates an execution of a second portion of the access operation on a second subset of the logical addresses within the storage component 195-b.

The controller 125 may include one or more host interfaces 110 that may be coupled with the host device 105 using the host links 115 that employs an interface protocol (e.g., the Gen-Z protocol, the CCIX protocol) as explained above. The host interfaces 110 may include physical layers for transmitting and receiving data through the host links 115 coupled with the host device 105.

The controller 125 may also include an interconnect router 140 coupled between the host interfaces 110 and one or more port managers 160. The interconnect router 140, in some examples, may provide a routing network to allow more than one host link 115 to connect to more than one storage component 195 associated with the port managers 160. For example, the interconnect router 140 may communicate data or addresses (e.g., associated with an access command) between a host interface 110 by a signal path 130 to a port manager 160 by a signal path 150. The interconnect router 140 may be an array of switches. By way of example, the system 100 illustrates that the first host link 115-a, using the host interface 110-a, may connect to one or more port managers (e.g., 160-a, 160-b, 160-c, and 160-d) while the second host link 115-b, using the host interface 110-b, may concurrently connect to the one or more port managers (e.g., 160-a, 160-b, 160-c, and 160-d).

During the routing process, the interconnect router 140 may generate interleaved addresses based on the host addresses (e.g., sequential addresses designated with a block of memory space) to distribute the request from the host device 105 across multiple storage component 195. So the host address (e.g., sequential addresses) may be in the domain of the host interface 110 while the interleaved addresses may be in the domain of the port managers 160 and associated storage component 195. The interleaved addressing scheme may, in some examples, be configured to leave no gap in the block of memory space associated with the host address (e.g., sequential addresses). In some examples, the interconnect router 140 may exchange data with the port managers 160 through signal paths 150.

Each storage component 195 may be configured to store code words of a code word size which may be different than a code word size used by the host device 105. The size of a code word stored at a storage component address within a storage component 195 may be a multiple of the size of a code word used by the host device 105. For example, the storage component 195 store data code words with a size that is two (2), three (3), four (4), or other integer number of times greater than the code word size of data stored at the host device 105. Each port manager 160 may include cache memory corresponding to a storage component 195. In some cases, the cache memory may enable data transactions between the host device 105 and the storage components 195 despite the mismatch in code word sizes (e.g., data granularity mismatch). Each cache address may be configured to store code words (e.g., data words) according to a size of the storage component 195. While each cache address corresponds to a single storage component address (e.g., and is configured to store a single code word that is the same size as a code word stored at the storage component 195), each cache address may further be configured to store a code word that is a same size as a code word used by the host device 105 within a portion of the memory associated with the cache address. For example, each cache address may be configured to store a single 128 byte code word corresponding to a storage component code word size. Each cache address may further be configured to store a 64 byte code word (e.g., associated with a host code word size) within a portion of the memory associated with the cache address.

In some cases, the cache memory may also decrease a number of accesses at the associated storage component 195, or increase a length of time between sequential accesses to a given address of the storage component 195. For example, a cache memory associated with the port manager 160-c may act to reduce a quantity of accesses to storage component 195-c. In some cases, the cache may be fully associative (e.g., each address within the cache may be configured to store data associated with any address of the corresponding storage component 195). When the host device 105 issues an access command (e.g., comprising an indication of an access operation, a logical address associated with the access operation, and, in some cases, data to be written to the storage component 195), a port manager 160 may determine a storage component address of the storage component 195 indicated by the logical address.

The port manager 160 may determine whether the cache includes valid data associated with the storage component address. In a case that the port manager 160 determines that the cache includes valid data associated with the storage component address (e.g., a cache hit), the port manager 160 may execute the access command at the cache. Alternatively, the port manager 160 may determine that the cache does not include valid data at the cache (e.g., a cache miss). In the case of a read operation, the port manager 160 may retrieve the data associated with the storage component address from the corresponding storage component 195 and store the retrieved data at the cache. For example, if port manager 160-b determines that a cache at the port manager 160-b does not include valid data associated with a storage component address (e.g., indicated by an access command), the port manager 160-b may retrieve the data from the storage component address within the storage component 195-b.

The port manager 160 may store the data associated with the access command (e.g., retrieved from the storage component 195 in the case of a read operation, included within the access command in the case of a write operation) at an address of the cache. The port manager 160 may then associate the address of the cache with the storage component address indicated within the access command. In some cases, the port manager 160 may store the data associated with the access command at a location within the cache that does not have any valid data. That is, the cache may not be full and the port manager 160 may store the data at an empty address within the cache. In another case, the port manager 160 may determine to evict valid data (e.g., associated with a different storage component address) from the cache to store the data associated with the access operation. Here, the port manager 160 may determine an address of the cache from which to evict data. During the eviction process, the port manager 160 may then ensure that the storage component address previously associated with the cache address is storing the same data as the data stored within the cache. Then, the port manager 160 may write the data associated with the access operation to at least a portion of the memory associated with the cache address, and update the cache address to be associated with the storage component address indicated by the access command.

In the case that each cache address is storing valid data (e.g., the cache is full), the port manager 160 may evict addresses of the cache based on an order of the addresses. For example, the port manager 160 may refer to an address pointer indicating an address to evict. The port manager 160 may determine to evict either the address indicated by the address pointer or a sequential address to the address indicated by the address pointer. The port manager 160 may determine which cache address to evict (e.g., the cache address indicated by the pointer, the sequential cache address) based on a quantity of accesses associated with each address. For example, if the address pointer indicates a first address associated with three (3) accesses and a second address (e.g., next to the first address according to the order indicated by the address pointer) is associated with one (1) access, the port manager 160 may determine to evict the contents of the second address.

In some examples, an individual port manager 160 (e.g., the port manager 160-b) may be coupled with one of storage component 195 (e.g., the storage component 195-b) through one of aggregated channels 190 (e.g., the aggregated channel 190-b). An individual channel of the aggregated channels 190 may include one or more logical channels 191. In some examples, each of the aggregated channels 190 may include eight logical channels 191. Eight logical channels (e.g., the logical channel 191-a through the logical channel 191-h) are illustrated for the port manager 160-a, which may represent a single aggregated channel 190 (e.g., an aggregated channel 190-a that is not shown). The aggregated channels 190 (e.g., the aggregated channel 190-b, 190-c, and 190-d) are illustrated for port managers 160-b, 160-c, and 160-d in an effort to increase visibility and clarity of the depicted features.

Each aggregated channel 190 may include additional channels to carry information related to various auxiliary functions such as error-correction code (ECC) or metadata.

A storage component 195 (e.g., storage component 195-a) may include multiple memory dice (e.g., sixteen memory dice) to obtain a desired memory capacity. Each memory die may include a local controller to collaborate with the controller 125 and to manage various memory operations within the memory die. In some examples, the memory dice may include non-volatile memory cells (e.g., 3DXP array of phase change memory cells). In other examples, the memory dice may include non-volatile memory cells including a chalcogenide alloy. In some examples, a code word or unit of data (e.g., 128 bytes) may be divided across the multiple memory dice within a storage component 195. In some examples, the controller 125 and the storage component 195 may be integrated with, in contact with, or placed on a board (e.g., a peripheral component interconnect express (PCIe) board).

Figure 2:
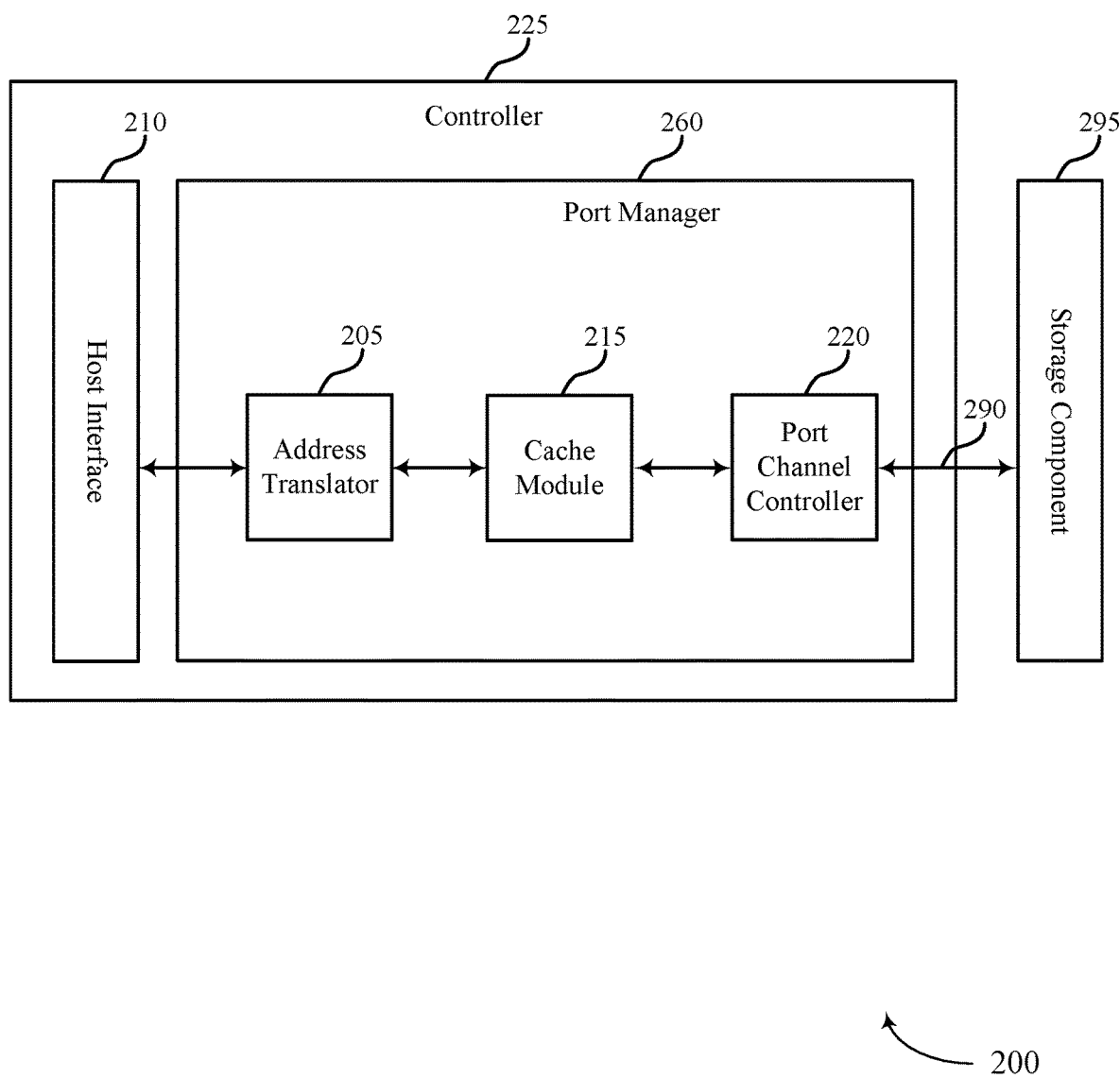
FIGS. 2 and 3 illustrate example memory subsystems that support mismatched transaction granularities in accordance with examples as disclosed herein.

FIG. 2 illustrates an example of a memory subsystem 200 that supports mismatched transaction granularities in accordance with examples as disclosed herein. The memory subsystem 200 may be an example of the memory subsystem 120 as described with reference to FIG. 1. The memory subsystem 200 may include a controller 225 and storage component 295, which may be examples of the controller 125 and the storage component 195 as described with reference to FIG. 1, respectively. In some examples, the controller 225 may be or include an ASIC or programmable logic. The controller 225 may include one or more host interfaces 210 that may be coupled with a host device (not shown) using a host link that employs an interface protocol (e.g., the Gen-Z protocol, the CCIX protocol) as explained above. The memory subsystem 200 may also include an interconnect router (not shown) coupled between the host interface 210 and the port manager 260. The port manager 260 may be coupled with the storage component 295 using an aggregated channel 290, which may be an example of the aggregated channels 190 as described with reference to FIG. 1. The port manager 260 may further include an address translator 205, a cache module 215, and a port channel controller 220.

The host interface 210 may include physical layers for transmitting and receiving data through a host link coupled with a host device. The host interface 210 may receive a transaction-layer protocol packet through the host link and may decode the packet to extract an access command (e.g., indicating an access operation) from the host device as well as addresses and data associated with the access command. The host interface 210 may send the decoded information to the port manager 260 (e.g., by an interconnect router). Additionally or alternatively, the host interface 210 may generate a transactional-layer protocol packet and transmit the packet to the host device through the host link. That is, the host interface 210 may receive information (e.g., by the interconnect router) from the port manager 260 and communicate that information within the packet to the host device.

The port manager 260 may include an address translator 205. The address translator 205 may determine an address of the storage component 295 associated with each access operation. That is, the host device may communicate access commands indicating a logical address for performing an access operation. However, the interconnect router may interleave sequential logical addresses (e.g., known by the host device) across multiple storage components 295. In some cases, a code word size associated with transactions at the host device is different than a code word size associated with transactions at the storage component 295. As a result, a single storage component address may correspond to one or more logical addresses at the host device. The address translator 205 may further account for this code word size mismatch (and corresponding difference in address space). To account for the difference in address space, the address translator 205 may not only determine a storage component address based on the logical address indicated in the access command, but also determine a relative location within the storage component address. For example, if a code word size of data associated with a logical address is four (4) times smaller than a code word size of data associated with a storage component address, the address translator 205 may indicate a storage component address and a position (e.g., first portion, second portion, third portion, fourth portion) within the storage component address.

The port manager 260 may further include a cache module 215. The cache module 215 may increase performance of the memory subsystem 200. The cache module 215 may include a fully-associated write-back cache and associated content addressable memory (CAM). In some cases, the CAM may search its memory space when presented with an address associated with an access operation to see if data associated with the address is stored anywhere in the cache. For example, the CAM may enable the cache module 215 to determine whether data associated with an address of the storage component 295 is currently stored within the cache or not. If the content is within the cache, the port manager 260 may fetch the content from the cache (e.g., for a read), or write data to the cache (e.g., for a write) and thus avoiding additional latency of access to the storage component 295. Alternatively, if the content is not within the cache (e.g., a cache miss), the port manager 260 may determine to access the storage component 295 for a read operation, or store the data in the cache for a write operation. That is, in the case of a read operation, the port manager 260 may access the storage component 295 to fetch the content associated with the address presented. In the case of a write operation, the port manager 260 may determine to store the code word included within the access command.

The port manager 260 may determine to store the content associated with the access operation within the cache module 215. In a case that the cache does not have any unused addresses, the cache module 215 may determine to evict data from an address within the cache. When determining which address of the cache to evict, the cache module 215 may refer to an address pointer indicating an address to evict. The cache module 215 may determine to evict either the address indicated by the address pointer or an address next to the address indicated by the pointer (based on an ordering of the cache addresses). The cache module 215 may determine which address to evict based on a quantity of accesses associated with each address. For example, if the address pointer indicates a first address associated with three (3) accesses and a second address (e.g., next to the first address according to the order indicated by the address pointer) is associated with one (1) access, the port manager 260 may determine to evict the contents of the second address.

The cache module 215 may facilitate shielding the storage component 295 from excessive transactions (e.g., read or write operations to memory cells), or transactions to a same address within a certain period of time by distributing a quantity of read or writes on a storage component 295. In some cases, successive transactions to a same address location within the storage component 295 may result in an increase in raw bit error rates. For example, if the storage component 295 is a DRAM storage component 295, successive transactions may cause error rates associated with row hammering. In another example, if the storage component 295 is 3DXPoint or phase change memory, successive transactions may result in increased error rates due to thermal build-up. The cache module 215 may increase a minimum amount of time between successive transactions to a same address location within the storage component 295. That is, if a host device issues sequential access commands targeting a single address within the storage component 295, the memory subsystem 200 may access the cache repeatedly rather than the storage component 295. Additionally, a depth of the cache (e.g., a quantity of addresses within the cache) may dictate a minimum amount of time between accessing a same address location within the storage component 295. The depth of the cache may be configured to ensure that the minimum amount of time between accessing the same location within the storage component 295 exceeds a threshold.

In order to facilitate a transfer of data between the host device and the storage component 295, the cache module 215 may be configured to support code words associated with the host device 105 and code words associated with the storage component 295 (e.g., that may be different sizes). For example, each address within a cache may include an upper portion and a lower portion each configured to store a code word associated with the host device (e.g., a 32 byte code word). Additionally, the upper and lower portions may be configured to collectively store a code word associated with the storage component 295 (e.g., a 128 byte code word).

The port channel controller 220 determine which channel within the aggregated channel 290 to use for communicating data between the storage component 295 and the port manager 260.

Figure 3:
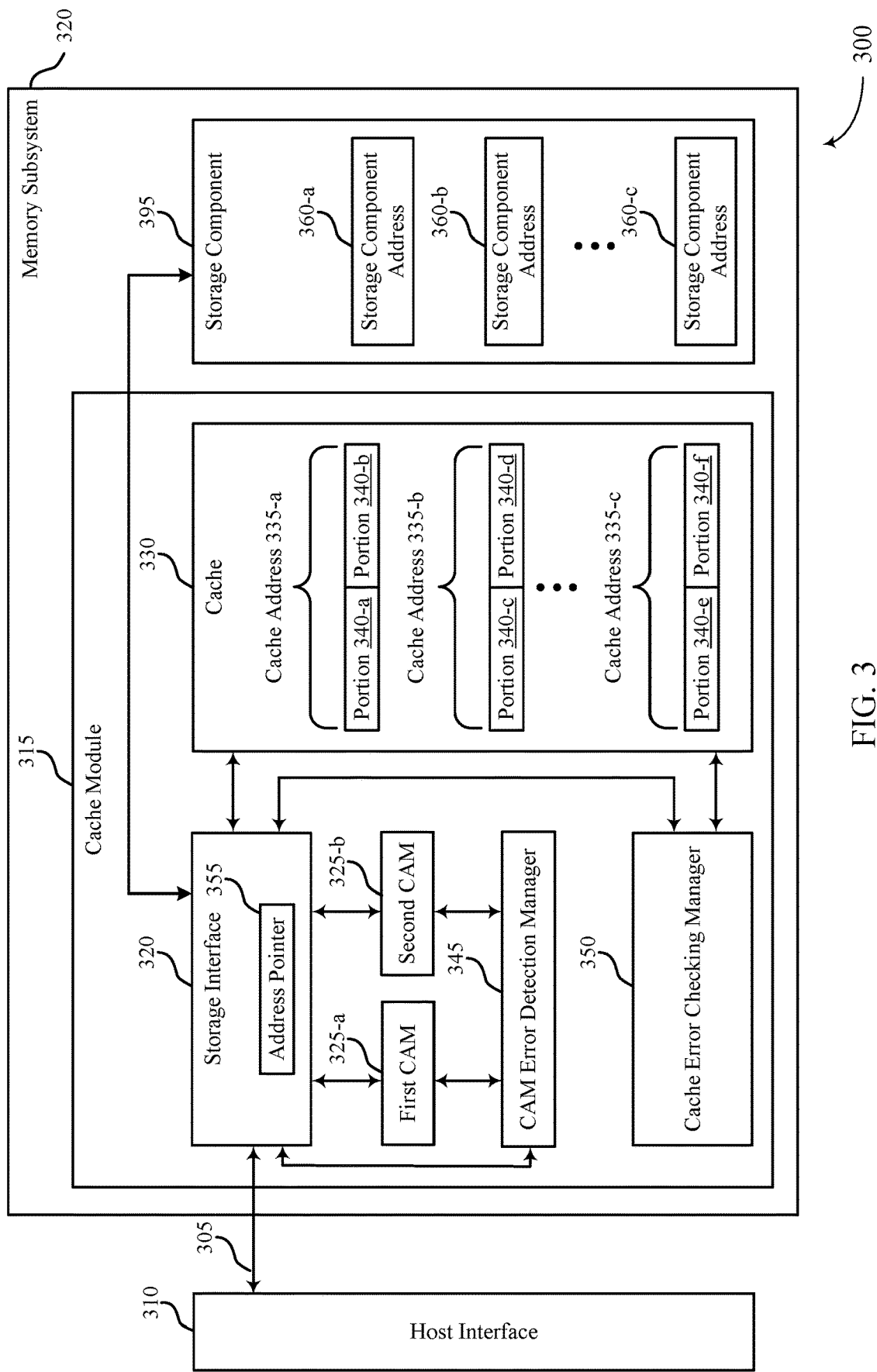

FIG. 3 illustrates an example of a memory subsystem 300 that supports mismatched transaction granularities in accordance with examples as disclosed herein. The memory subsystem 300 may be an example of the memory subsystem 120 as described with reference to FIG. 1 or memory subsystem 200 as described with reference to FIG. 2. The memory subsystem 300 may include a host interface 310 and storage component 395, which may be an example of a host interface 110 or 210 and storage components 195 and 295, respectively, as described with reference to FIGS. 1 and 2. The memory subsystem 300 may further include a cache module 315, which may be an example of the cache module 215 as described with reference to FIG. 2. The cache module 315 may include a storage interface 320, CAMs 325, and a cache 330.

The host interface 310 may receive access commands from a host device (e.g., host device 105 as described with reference to FIG. 1). The access commands from the host device may include one or more logical addresses associated with an execution of the access command. The host interface 310 may communicate the access commands to one or more cache modules 315 via an interconnect router (e.g., interconnect router 140 as described with reference to FIG. 1). The interconnect router may distribute the access command for execution at one or more port managers and corresponding storage component 395. In some cases, prior to receiving the access commands at the cache module 315, the memory subsystem 300 may route the access commands through an address translator, such as the address translator 205 as described with reference to FIG. 2. The address translator may account for the interleaving (e.g., resulting from the interconnect router) and translate the logical address to a storage component address 360. In some cases, a code word size associated with transactions at the host device is different than a code word size associated with transactions at the storage component 395. As a result, a single storage component address 360 may correspond to one or more logical addresses at the host device. The address translator may further account for this code word size mismatch.

The storage interface 320 may receive an access command 305 from the host interface 310 (e.g., via the interconnect router and the address translator). The access command 305 may include an indication of a storage component address 360 and, in some cases, data to be stored at the storage component address 360 (e.g., in the case that the access command 305 indicates a write operation). In some other cases, the storage interface 320 may include aspects of an address translator (e.g., as described with reference to FIG. 2). Here, the storage interface 320 may receive an access command 305 from the host interface that includes an indication of an address according to an address space used by the host device (e.g., virtual address space). The storage interface 320 may determine a storage component address 360 based on the address included in the access command. For example, where the storage component may have a code word size of 128 bytes while the access command includes a code word size of 64 bytes, the "virtual" address space may be twice as large as the address space of the storage component. That is, "virtual" addresses may be translated according to the difference in address space sizes. The storage interface 320 may communicate the storage component address 360 to the first and second CAMs 325. The CAMs 325 may indicate, to the storage interface 320, whether data corresponding to the storage component address 360 is stored within the cache 330. The cache 330 may be a memory component (e.g., a static random access memory (SRAM)) configured to store a portion of the data that is stored or is to be stored at the storage component 395. In some cases, access operations performed at the cache 330 (e.g., as opposed to the storage component 395) may experience less latency and may protect the storage component 395 from excessive access operations, thus increasing a reliability of the storage component 395.

The cache 330 may include a certain quantity of cache addresses 335 (e.g., 20,480) each including more than one portion of data 340. The cache 330 may be fully-associative. That is, each of the cache addresses 335 may store data associated with any of the storage component addresses 360 of the storage component 395. Each cache address 335 may be configured to store a certain quantity of bits. The quantity of bits may be grouped into various fields. For example, each cache address 335 may include one or more of a code word data field (e.g., including a code word of data), an error correction field (e.g., error correction information generated based on each of the bits within a portion 340 or error correction information generated based on each of the bits stored within the cache address 335-$a$), a hit count field (e.g., indicating a quantity of times the code word associated with the portion of data 340 has been accessed), a valid field (e.g., indicating whether the data stored within the cache address 335 corresponds to data stored at a storage component address 360), a dirty field (e.g., indicating whether the data stored at the cache address 335 corresponds to data stored at a storage component address 360 but has been updated from the data stored at the storage component address 360), and a poison field (e.g., indicating whether the data stored at the cache address 335 is corrupted due to, for example, a quantity of errors within the data exceeding a threshold). In some cases, each portion 340 may include the data field. For example, each portion 340 may include a code word data field, a valid field, a dirty field, and a poison field. Additionally or alternatively, the cache address 335 may include data fields common to each of the portions 340 within the cache address. For example, the cache address 335-*c* may have a hit count field that is shared by both portions 340-*e* and 340-*f*.

In one example, each of the cache addresses 335 may include 1054 bits (although one skilled in the art would understand that this quantity is given by example and different implementations may use different quantities of bits). In one example of a cache address 335 that is configured to store 1054 bits of information, cache address 335-*a* may include a two (2) bit hit count field common to both portions of data 340-*c* and 340-*d*. Each of the portions of data 340-*c* and 340-*d* may include a 512 bit code word data field, a one (1) bit valid field, a one (1) bit dirty field, a one (1) bit poison field, and an eleven (11) bit error correction field.

The cache 330 may be configured to enable data transactions according to a code word size of the storage component 395 as well as data transactions according to a code word size of a host device. In some cases, there may be a mismatch between the storage component 395 code word size and the host device code word size. That is, there may be a transaction granularity mismatch between a link to the host device and the storage component 395. Each cache address 335 may be configured to store a single code word of a storage component 395 code word size. For example, a combination of the portion of data 340-*a* and the portion of data 340-*b* may be configured to store a code word that is a same size as a code word stored at a storage component address 360. In order to account for the transaction granularity mismatch between the host device and the storage component 395, each cache address 335 may further be configured to store one or more code words that are a size of a code word used by the host device. Here, each cache address 335 may include two portions of data 340 that are each configured to store a code word of data that is a code word size used by the host device.

In one example, while each portion of data 340 may include a 64 byte code word, each storage component address 360 may store a 128 byte code word. In some cases, the collective contents of a cache address 335 may correspond to a code word within a storage component address 360. For example, the portion of data 340-*a* of cache address 335-*a* may include an upper 64 bytes of the 128 byte code word stored at the storage component address 360-*b* while the portion of data 340-*b* of the cache address 335-*a* includes a lower 64 bytes of the 128 byte code word stored at the storage component address 360-*b*.

The CAMs 325 may include entries indicating an address of the storage component 395 associated with each address in the cache 330. For example, a first entry in the CAMs 325 may correspond to cache address 335-*a*. The first entries may indicate a storage component address 360 (e.g., storage component address 360-*c*) associated with the data in the cache address 335-*a*. If a cache address 335 is invalid (e.g., does not include valid data associated with a storage component address 360, the CAM 325 may include an entry with all bits set to a logic value '1.' In some cases, the CAMs 325 may include entries that are a same size as the storage component addresses 360. For example, if each storage component address 360 is addressable by 34 bytes, each CAM entry may also be 34 bytes.

The first CAM 325 and the second CAM 325-*b* may act as duplicate CAMs 325. That is, the CAMs 325 may be configured to each store a same set of entries and may be used to detect and correct errors that may occur in the other CAM 325. For example, if the storage interface 320 indicates storage component address 360-*a* to the first CAM 325-*a* and the second CAM 325-*b* and both CAMs 325 report a same cache address 335-*a* to the CAM error detection manager 345, the CAM error detection manager 345 may determine that there are no errors in either of the CAMs 325 at the entry associated with the cache address 335-*a*. Alternatively, if one CAM 325 indicates the cache 330 does not include data associated with the storage component address 360 while the second CAM 325 indicates that the cache 330 does include data associated with the storage component address 360, the CAM error detection manager 345 may determine that there is an error associated with the corresponding cache entry in one of the CAMs 325. In another example, if each of the CAMs 325 indicate different cache addresses 335 associated with the storage component address 360, the CAM error detection manager 345 may determine that there is an error associated with at least one of the corresponding cache entries in the CAMs 325.

To determine which CAM 325 contains an error, the CAM error detection manager 345 may deliver the one or more cache addresses 335 received from the CAMs 325 to the storage interface 320. The storage interface 320 may fetch the data from the indicated cache address 335 and communicate the data to the CAM error detection manager 345. Each of the portions of data 340 stored at a cache address 335 may include error correction information. Performing an error detection operation (e.g., a single error correction double error detection (SECDED) operation) on each of the portions of the data stored at the cache address 335 may indicate whether the data stored at the cache address 335 is associated with the storage component address 360. Based on determining an error in one of the CAMs 325 by performing the error detection operation, the CAM error detection manager 345 may correct the detected errors within the CAM 325.

During the execution of a access command (e.g., a read command, a write command), the storage interface 320 may receive an indication of a storage component address 360. For example, the host interface 310 may receive the access command from a host device, the access command indicating an access operation (e.g., a write operation, a read command) and a logical address. The host interface 310 may communicate the access command to the storage interface 320. In some cases, the host interface 310 may communicate the access command to the storage interface 320 by an address translator. The address translator may determine the address of the storage component address 360 based on the logical address. In another example, the storage interface 320 may include aspects of an address translator. Here, the storage interface 320 may determine the storage component address 360 based on the logical address. In some cases, a difference in code word size associated with the logical address space and the address space associated with the storage component 395, a logical address may correspond to a portion of a storage component address 360. For example, the storage interface 355 may determine that the code word is to be stored at an upper portion of the storage component address 360-*a*. In another example, the storage interface 355 may determine that the code word is to be stored at a lower portion of the storage component address 360-*b*.

During the execution of a write command, the write command may include a code word for storing at a storage component address 360. The storage interface 320 may determine (e.g., based on an indication from a CAM 325) that a cache address 335 includes data related to the storage component address 360 associated with the logical address indicated by the write command. The storage interface 320 may communicate the code word to the cache error checking manager 350. The cache error checking manager 350 may generate an error checking value associated with the code word. In some cases, the error checking value may further be associated with other data fields stored at the cache address 335. For example, the error checking value may further be based on one or more of a hit count field, a valid field, a dirty field, and a poison field. The storage interface 320 may write the code word indicated by the write command to portion 340 of the cache address 335. The storage interface 320 may further write the error checking value associated with the code word to the portion 340 of the cache address 335.

During the execution of a read command, the storage interface 320 may receive an indication of a cache address 335 that corresponds to the storage component address 360 associated with the logical address indicated by the read command. The storage interface 320 may read the contents of the indicated cache address 335. The storage interface 320 may communicate the data read from the cache address 335 to the cache error checking manager 350. The cache error checking manager 350 may perform an error checking process on the data read from the cache address 335 based on error checking values associated with the data (and stored at the cache address 335). The cache error checking manager 350 may detect and/or correct errors within a code word stored at the cache address 335. The storage interface 320 may communicate the code word (e.g., that has undergone the error checking process) to the host interface 310 to be communicated to the host device. In some cases, the storage interface 320 may rewrite the code word (e.g., that has undergone the error checking process) to the cache address 335 to correct any detected errors within the previously-stored code word.

During the execution of either the read command or the write command (and in the case that the indicated data is stored at the cache 330), the access command may result in accessing the cache 330 rather than accessing the storage component 395, which may protect the storage component 395 from excessive access operations. Upon performing the indicated access operation associated with the cache address 335, the storage interface 320 may update a hit count field associated with the cache address 335 (and stored at the cache address 335 within a hit count field). In some cases, the hit count field may be a two (2) bit field stored at each cache address 335. When data is initially written to the cache address 335, the hit count field may be set to zero (e.g., each of the bits within the hit count field are a logic value '0'). Each time the cache address 335 is accessed, the storage interface 320 may update the hit count field by one (1), saturating when each of the bits within the hit count field is a logic value '1'. Here, if the cache address 335 is accessed, the storage interface 320 may leave the hit count field as all logic value '1s,' indicating a maximum quantity of hits (e.g., three (3)) able to be represented by the hit count field.

When the storage interface 320 receives an indication that the cache 330 does not include data associated with the indicated storage component address 360, the storage interface 320 may determine a cache address 335 to evict in order to store the data associated with the indicated storage component address 360. The storage interface 320 may determine to evict data associated with the address pointer 355. The address pointer 355 may be a pointer that cycles through each of the cache addresses 355 according to an order. For example, the address pointer 355 may be initialized to point to a first cache address 335-a. Incrementing the address pointer 355 by a value of one (1) may cause the address pointer 355 to point to a next cache address 335-b. Incrementing the address pointer 355 by a value of one (1) when the address pointer 355 is pointing to a last cache address 335-c may cause the address pointer 355 to be reset to point to the first cache address 335-a.

If the address pointer 355 is pointing to a cache address 335 with a hit count value less than or equal to a threshold value (e.g., one (1) hit), the storage interface 320 may determine to evict the contents of the cache address 335. Additionally or alternatively, if the storage interface 320 determines that the hit count value of the cache address 335 exceeds the threshold value, the storage interface 320 may determine a hit count value associated with the next cache address 335 (e.g., according to the order of cache addresses 335 indicated by the address pointer 355). For example, if the address pointer 355 is pointing to the cache address 335-a which has a hit count value of zero (0), the storage interface 320 may determine to evict the contents of the cache address 335-a. But if the cache address 335-a has a hit count value of three (3), the storage interface 320 may determine the hit count value of cache address 335-b. If the hit count value of the next cache address 335 is less than the hit count value of the first cache address 335, the storage interface 320 may evict the contents of the next cache address 335. Alternatively, if the hit count value of the next cache address 335 is equal to or greater than the hit count value of the first cache address 335, the storage interface 320 may evict the contents of the first cache address 335 or continue to determine the hit count value of sequential cache addresses 335. For example, the storage interface may determine the hit count value of sequential cache addresses up to a maximum number hit count values (e.g., two (2), three (3), four (4)). In the case that the one of the sequential cache addresses 335 has a hit count value lower than the threshold hit count value, the storage interface 320 may evict the contents of that cache address 335. Alternatively, the storage interface 320 may determine each of the sequential hit count values (e.g., the maximum number of hit count values associated with each sequential cache address 335) and evict the contents of the sequential cache addresses 335 with a lowest hit count value.

Depending on which cache address 335 is evicted, the storage interface 320 may update the address pointer 355. For example, if the storage interface 320 evicts the contents of the cache address 335 indicated by the address pointer 355, the storage interface 320 may increment the address pointer 355 by one (1) to point to the next cache address 335. Additionally or alternatively, if the storage interface 320 evicts the contents of a sequential cache address, the storage interface 320 may update the address pointer 355 to point to a cache address 335 sequential to the evicted cache address 335.

When the storage interface 320 evicts data from a cache address 335, the cache error checking manager 350 may perform an error checking process on the data being evicted from the cache address 335. In a case that only one portion of data 340 is being evicted from a cache address 335, the error checking manager 350 may only perform the error checking process on the portion of data 340 being evicted. Alternatively in a case that all of the data within a cache address 335 is being evicted, the error checking manager 350 may perform an error checking process on all of the portions of data 340 within the cache address 335. For example, if the data stored at the cache address 335-b is being evicted, the cache error checking manager 350 may perform a first error checking process on the portion of data 340-c based on an error checking value stored within the portion of data 340-c. The cache error checking manager 350 may further perform a second error checking process on the portion of data 340-d based on a second error checking value stored within the portion of data 340-d. The cache error checking manager 350 may communicate the error-checked data evicted from the cache address 335-b to the storage interface 320.

In some cases, the storage interface 320 may determine to preserve the data previously stored within the cache address 335. That is, the storage interface 320 may determine whether a code word stored in either portion of data 340 is valid or invalid, dirty or clean, or poison. If a code word is invalid, valid and clean, or poison, the storage interface 320 may discard the contents of the cache address 335. However, if the code word is valid and dirty, the storage interface may update the code word stored in the corresponding storage component address 360 prior to evicting the data from the cache address. In a case that the size of the code word that is valid and dirty corresponds to a code word size used by the storage component 395, the storage interface 320 may write the code word to the corresponding storage component address 360. Alternatively, if the size of the code word (e.g., the first code word) corresponds to a code word size used by the host device, the storage interface 320 may read a code word stored at the storage component address 360 (e.g., the second code word) and generate an updated code word (e.g., a third code word) based on the first code word (e.g., stored at the cache 220) and the second code word (e.g., stored at the corresponding storage component address 360). For example, the storage interface 320 may concatenate a portion of the first code word and the second code word to generate the third code word.

The storage interface 320 may write the updated code word (e.g., the third code word) to the corresponding storage component address 360. In some cases, the storage interface 320 may write the entire updated code word to the storage component address 360. In some other cases, the storage interface 320 may determine that a portion of the updated code word are the same as a portion of the code word stored at the storage component address 360. Here, the storage interface 320 may suppress a portion of the write operation when writing the updated code word to the storage component address 360. For example, if the storage interface 320 determines that a first half of the updated code word is the same as the first half of the code word stored at the storage component address 360-a, the storage interface 320 may suppress the first half of the write operation. As a result, only the second half of the code word stored at the storage component address are re-written. In some cases, this may reduce a number of accesses associated with the memory cells of the storage component 395.

When the storage interface 320 writes a new code word of a first size to a portion of data 340 of a cache address 335, the storage interface 320 may also updated the corresponding entry in both the first CAM 325-a and the second CAM 325-b. In one example, if an upper portion of data 340-e and a lower portion of data 340-f of a cache address 335-c are both valid and not dirty (e.g., both corresponding to a same storage component address 360) and a code word of a first size is written to the upper portion 340-e of the cache address 335-c after evicting the data from the cache address, the data within the lower portion 340-f of the cache address 335-c is now invalid. That is, the cache address 335-c is now associated with a different storage component address 360 than the contents of the lower portion of data 340-f. In some other cases, the storage interface 320 may automatically populate each cache address 335 with code words in each portion of data 340 that are associated with a same storage component address 360. That is, in the case the upper portion of data 340-e of the cache address 335-c is associated with the storage component address 360-b, the storage interface 320 may write the rest of the code word stored at the storage component address 360-b to the lower portion of data 340-f. Here, both portions of data 340-e and 340-f may be valid.

In some cases, the CAM error detection manager 345 and the cache error checking manager 350 may perform periodic ECC scrub operations on the CAMs 325 and the cache 330, respectively. The ECC scrub operation on the CAMs 325 may include the CAM error detection manager 345 reading each of the contents of each of the CAMs 325, comparing each entry, performing an error detection operation in a case that the entries to not match, and correcting one or more errors as a result. The ECC scrub operation on the cache 330 may include the cache error checking manager 350 reading the contents of each cache address 335 from the cache, performing an error checking process on both portions of data 340 stored within each cache address, and writing the contents of the cache address 335 back to the cache. In some cases, the periodicity of the ECC scrub operation may be significantly less often than a periodicity of reading the contents of a cache address 335, thus making the latency introduced by the ECC scrub operation less significant. For example, if a cache address 335 is read one billion times a second, and the contents of each cache address 335 are scrubbed every 0.1 second, less than 0.03% of a read capability of the cache module 315 is utilized for performing the ECC scrub operation.

Figure 4:
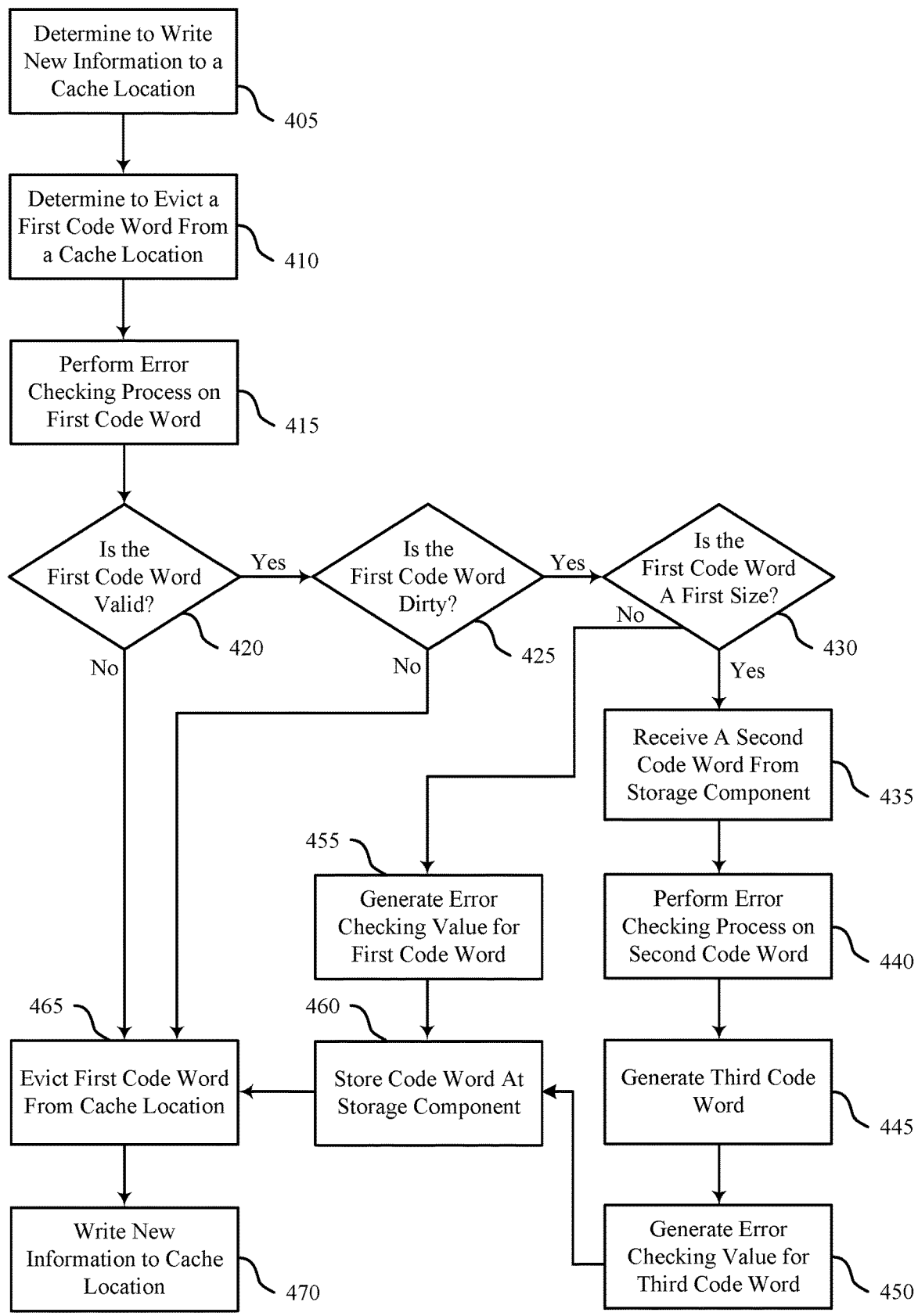
FIG. 4 illustrates an example of a process flow that supports mismatched transaction granularities in accordance with examples as disclosed herein.

FIG. 4 illustrates an example of a process flow 400 that supports mismatched transaction granularities in accordance with examples as disclosed herein. The process flow 400 may include operations performed by a device or component as described with reference to FIGS. 1-3. For example, the process flow 400 may include operations performed by a controller 125 or 225 or a port manager 160 or 260 as described with reference to FIGS. 1 and 2. Additionally or alternatively, the process flow 400 may include operations performed by a cache module 215 or 315 as described with reference to FIGS. 2 and 3.

At 405, a device may determine to write new information to a cache location (e.g., a cache address). For example, the device may receive an access command from a host device. In some cases, the access command may be a write command indicating to write the new information to a logical address associated with a storage component address, where the storage component may be included within the device or in electronic communication with the storage device. Here, the device may determine to store the new information at the cache location. In some other cases, the access command may be a read command. The read command may indicate a logical address associated with a storage component address. The device may determine that the cache does not include information associated with the storage component address and determine to read the new information from the storage component address to the cache location. In some cases, the device may determine the cache location (e.g., from a set of cache locations) based on a cache location indicated by an address pointer as described with reference to FIG. 3 and a hit count associated with information previously stored at the cache location.

At 410, the device may determine to evict a first code word (e.g., included within the information previously stored at the cache location) from the cache location. For example, after determining the write new information to the cache location, the device may determine to evict the first code word previously stored at the cache location. For example, the first code word may be stored in an upper portion of the cache location or a lower portion of the cache location. In another example, the first code word may be stored in a combination of the upper and lower portion of the cache location.

At 415, the device may perform an error checking process on the first code word. For example, the information stored at the cache location may include the first code word and an error checking value associated with the first code word. Here, the device may perform the error checking process based on the error checking value associated with the first code word. The error checking process may include detecting or correction errors within the first code word. In some cases, at 415 the device may determine that a quantity of errors within the first code word exceeds a correction capability of the device. Here, the device may determine that the first code word is poison. As a result, the device may proceed to execute operations described at 465. Alternatively, if the device performs the error checking process on the first code word and determines that a quantity of errors detected or corrected by the error checking process does not exceed the correction capability of the device, the device may proceed to execute operations described at 420.

At 420, the device may determine whether the first code word is valid. The information previously stored at the cache location may include a valid field. The valid field may indicate whether the first code word is valid. For example, the valid field may contain a logic value '1' to indicate that the code word is valid or a logic value '0' to indicate that the code word is not valid. In a first case, the device may determine that the first code word is not valid and does not correspond to data stored at a storage component address associated with the information previously stored at the cache location. Here, the device may proceed to execute operations described at 465.

In a second case, the device determines that the first code word is valid at 420. That is, the first code word may correspond to data stored at a storage component address associated with the information previously stored at the cache location. Here, the device may proceed to execute operations described at 425. At 425, the device may determine whether the first code word is dirty. The information previously stored at the cache location may include a dirty field. The dirty field may indicate whether the first code word is dirty. For example, the dirty field may contain a logic value '1' to indicate that the code word is dirty or a logic value '0' to indicate that the code word is not dirty. In a first case, the device may determine that the first code word is not dirty. Here, the first code word may by the same as at least a portion of the data stored at the storage component address associated with the information previously stored at the cache location. In the case that the device determines that the first code word is not dirty, the device may proceed to execute operations described at 465.

In a second case, the device may determine that the first code word is dirty at 425. That is, the first code word may be an updated version of data stored at the storage component address associated with the information previously stored at the cache location. Here, the device may proceed to execute operations described at 430. At 430, the device may determine whether the first code word is a first code word size. For example, the cache location may be configured to store a code word that is a second size associated with data stored at a storage component address. The cache may further be configured to store one or more code words that are the first size associated with an amount of data indicated by a logical address (e.g., a code word size associated with a host device). In some cases, the cache location may include a first portion and a second portion that in combination store a code word of the second size and individually store a code word of the first size. In a first case, the device may determine that the first code word is not the first size. That is, the device may determine that the code word is a second size associated with an amount of data stored at a storage component address. In the first case that the device determines that the first code word is not the first size, the device may proceed to execute operations as described at 455.

In a second case, the device may determine that the first code word is the first size at 430. Here, the device may proceed to execute operations described 435. At 435, the device may receive a second code word from the storage component. The second code word may be a code word stored at the storage component address (e.g., a first address) associated with the information previously stored at the cache location. Thus, the second code word may be the second size.

At 440, the device may perform an error checking process on the second code word. The device may perform the error checking process based on an error checking value associated with the second code word. For example, the first address of the storage component (e.g., the storage component address associated with the information previously stored at the cache location) may store the second code word and the error checking value associated with the second code word. The device may further receive the error checking value associated with the second word (e.g., at 435).

At 445, the device may generate a third code word that is the second size. The device may generate the third code word by merging the first code word and the second code word. For example, the device may concatenate the first code word and a portion of the second code word.

At 450, the device may generate an error checking value associated with the third code word.

At 455, the device may generate an error checking value associated with the first code word.

At 460, the device may store a code word at the first address of the storage component. The device may also store an error checking value associated with the code word at the first address of the storage component. In a case that the device performs operations described at 455 prior to performing operations described at 460, the device may store the first code word and an error checking value associated with the first code word at the first address of the storage component. Alternatively, in a case that the device performs operations described at 450 prior to performing operations described at 460, the device may store the third code word and an error checking value associated with the third code word at the first address of the storage component. When the device writes the third code word to the first address of the storage component, the device may determine whether any of the data within the third code word is the same as data within the second code word (e.g., the code word previously stored at the first address of the storage component). In a case that the device determines that a portion of the second code word and the third code word are the same, the device may suppress a portion of the write operation. For example, the device may determine that a first half of the third code word includes the same data as the first half of the second code word. Here, the device may suppress a first half of the write operation so only the second half of the third code word (e.g., the portion of the third code word that is different than the second code word) is written to the first address of the storage component. For example, the third code word may be written to multiple memory devices (e.g., memory chips), and the device may suppress writes to a subset of the multiple devices. Additionally or alternatively, the device may compare the data of the third code word with the data of the second code word on a granularity associated with the memory devices and suppress writes to memory devices for which the data does not change.

At 465, the device may evict the first code word from the cache location. In some cases, the device may evict additional information from the cache location. For example, the cache location may be storing the first code word as well as an error checking value associated with the first code word, various data fields associated with the first code word (e.g., a hit count field, a valid field, a dirty field, a poison field, etc.). At 465, the device may evict the first code word as well as information associated with the first code word stored at the cache location.

At 470, the device may write the new information to the cache location.

Figure 5:
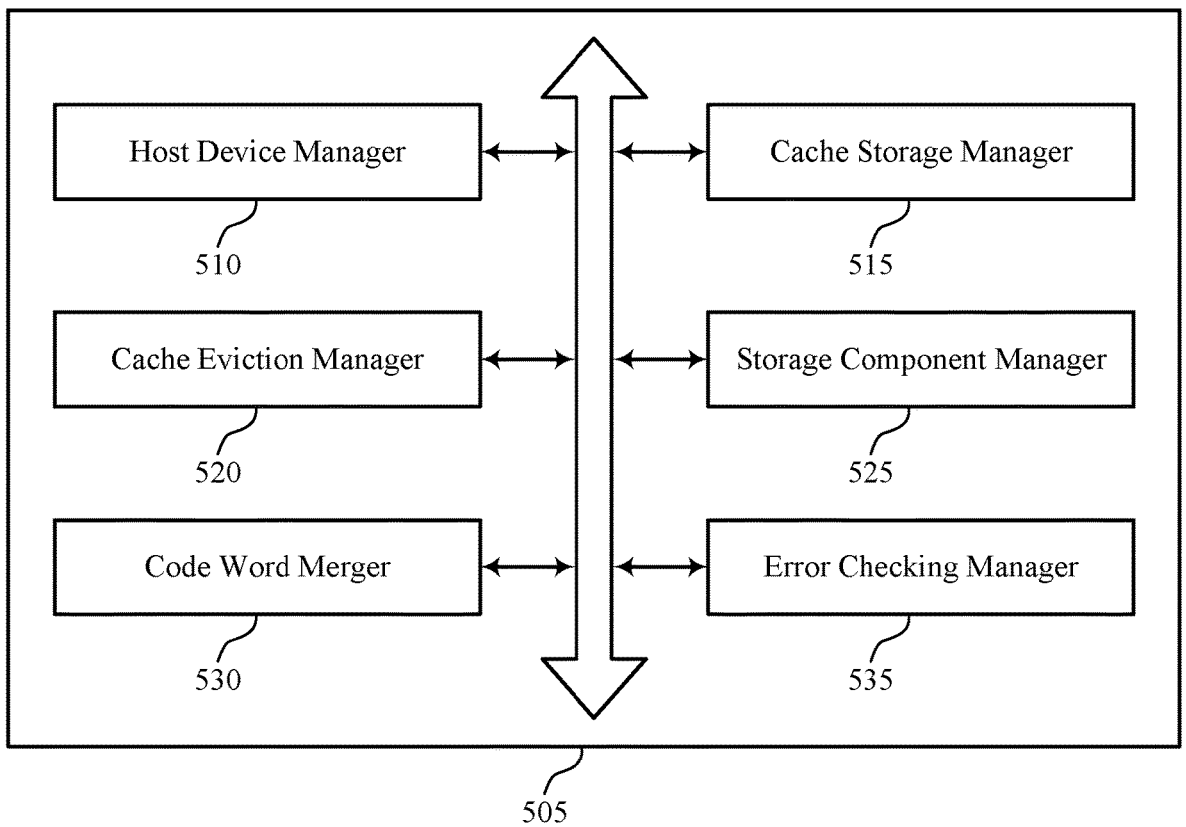
FIG. 5 shows a block diagram of a memory device that supports mismatched transaction granularities in accordance with aspects of the present disclosure.

FIG. 5 shows a block diagram 500 of a memory device 505 that supports mismatched transaction granularities in accordance with examples as disclosed herein. The memory device 505 may be an example of aspects of a memory susbsystem as described with reference to FIGS. 1-3. The memory device 505 may include a host device manager 510, a cache storage manager 515, a cache eviction manager 520, a storage component manager 525, a code word merger 530, and an error checking manager 535. Each of these modules may communicate, directly or indirectly, with one another (e.g., via one or more buses).

The host device manager 510 may receive, from a host device, a first code word of a first size for storing in a first address of a storage component. In some examples, the host device manager 510 may receive, from the host device, a logical address associated with the first code word. The host device manager 510 may determine the first address based on the logical address, the first size, and the second size. In some examples, the host device manager 510 may receive a fourth code word of the first size for storing in the first address of the storage component. In some other examples, the host device manager 510 may receive, from the host device, a fourth code word of the first size for storing in a second address of the storage component. In some cases, the host device manager 510 may receive, from the host device, a fifth code word of the first size for storing in the second address of the storage component.

The cache storage manager 515 may store the first code word in a first portion of a first location of a cache. In some examples, the cache storage manager 515 may store the fourth code word and the second error checking value in a second portion of a second location of the cache. In some other examples, the cache storage manager 515 may store the fourth code word in a first portion of a second location of the cache with a first indication that the first portion of the second location of the cache contains valid data. In some cases, the cache storage manager 515 may store the fifth code word in a second portion of the second location of the cache with a second indication that the second portion of the second location of the cache contains valid data.

The cache eviction manager 520 may determine to evict information in the first location of the cache. In some examples, the cache eviction manager 520 may determine to evict information in the second location from the cache.

The storage component manager 525 may receive, from the first address of the storage component, a second code word of a second size based on determining to evict the information in the first location from the cache.

The code word merger 530 may merge the first code word stored in the first portion of the first location of the cache with the second code word to obtain a third code word of the second size. In some examples, the code word merger 530 may concatenate the first code word with a portion of the second code word of the first size to generate the third code word, where merging the first code word stored in the first portion of the first location of the cache with the second code word is based on concatenating the first code word with the portion of the second code word. The second size may be an integer multiple of the first size.

The storage component manager 525 may write the third code word to the first address of the storage component. In some examples, the storage component manager 525 may determine that a subset of the third code word associated with a cycle of a burst for a channel of the set of channels has a same set of bit values as a corresponding subset of the second code word. Here, the storage component manager 525 may suppress a write operation associated with the channel for the cycle of the burst based on the determining that the subset of the third code word has the same set of bit values as the corresponding subset of the second code word, where writing the third code word to the first address is based on suppressing the write operation. In some cases, the channel is associated with a memory chip of the storage component.

In some examples, the storage component manager 525 may write a sixth code word generated from the first and second portions of the second location of the cache to the second address of the storage component based on determining to evict the information in the second location from the cache, where the writing is independent of a seventh code word previously stored at the second address of the storage component based on the first and second indications.

The error checking manager 535 may generate a first error checking value associated with the first code word. In some examples, the error checking manager 535 may store the first error checking value in the first portion of the first location of the cache, where storing the first code word in the first portion of the first location is based on storing the first error checking value in the first portion of the first location. The error checking manager 535 may perform an error checking process on the first code word stored in the first location of the cache based on the first error checking value stored in the first location of the cache to obtain a corrected first code word for merging with the second code word, where merging the first code word stored in the first portion of the first location with the second code word is based on performing the error checking process.

The error checking manager 535 may perform an error checking process on the second code word based on a first error checking value received from the first address of the storage component to obtain a corrected second code word for merging with the first code word stored in the first portion of the first location of the cache. In some examples, the error checking manager 535 may generate a second error checking value based on the third code word, where merging the first code word stored in the first portion of the first location of the cache with the second code word is based on generating the second error checking value. In some cases, the error checking manager 535 may generate a second error checking value associated with the fourth code word.

Figure 6:
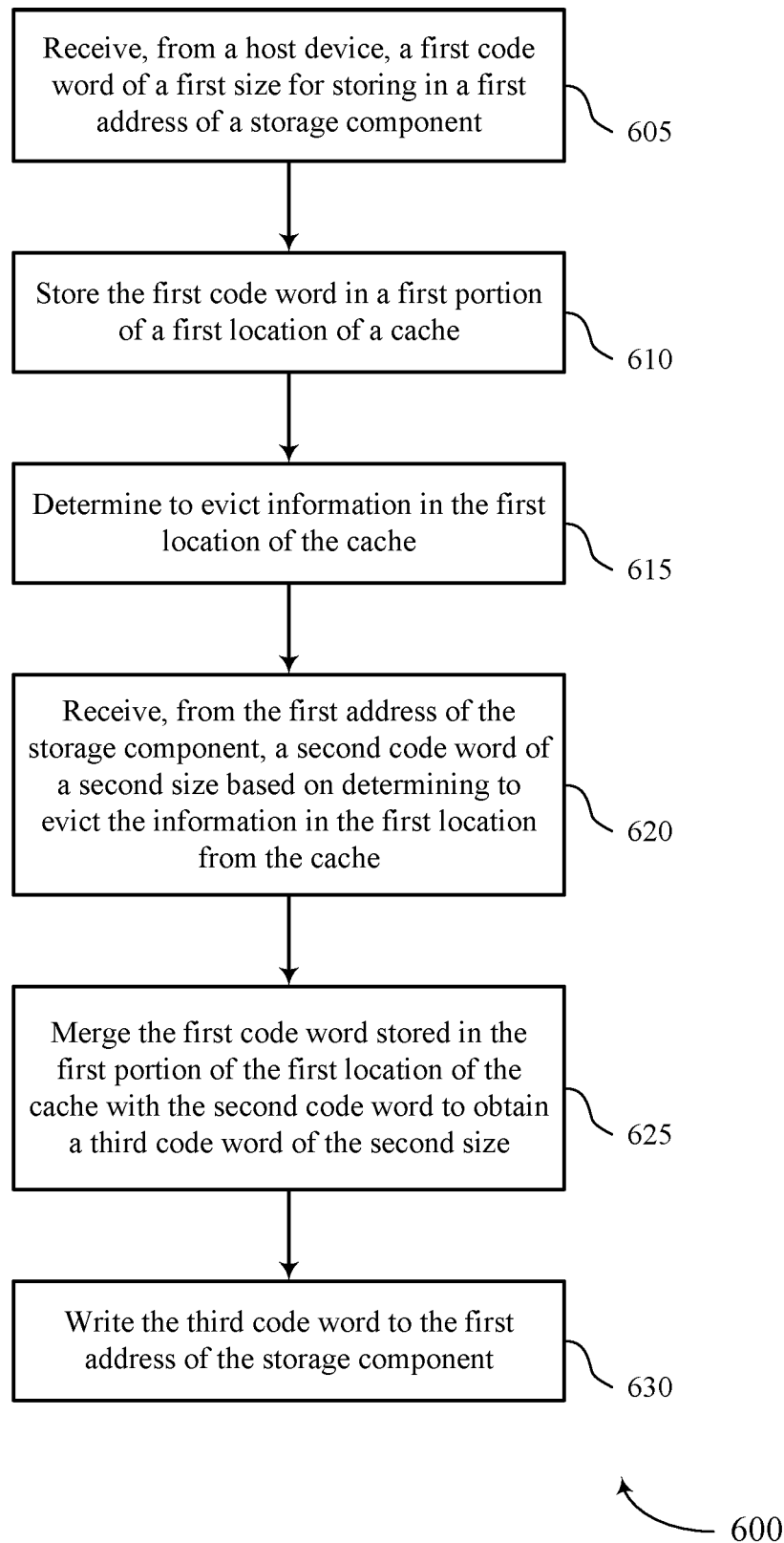
FIGS. 6 and 7 show flowcharts illustrating a method or methods that support mismatched transaction granularities in accordance with examples as disclosed herein.

FIG. 6 shows a flowchart illustrating a method or methods 600 that supports methods for supporting mismatched transaction granularities in accordance with aspects of the present disclosure. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may receive, from a host device, a first code word of a first size for storing in a first address of a storage component. For example, the memory device may receive a write command from a host device including the first code word. The write command may further indicate a first address of the storage component. The operations of 605 may be performed according to the methods described herein. In some examples, aspects of the operations of 605 may be performed by a host device manager as described with reference to FIG. 5.

At 610, the memory device may store the first code word in a first portion of a first location of a cache. The memory device may include data fields at the first location of the cache indicating that the first code word is valid (e.g., corresponds to data stored at the first address of the storage component) and dirty (e.g., the data stored at the first address of the storage component is not updated). The operations of 610 may be performed according to the methods described herein. In some examples, aspects of the operations of 610 may be performed by a cache storage manager as described with reference to FIG. 5.

At 615, the memory device may determine to evict information in the first location of the cache. For example, the memory device may receive an access command from a host device and determine that the cache does not include data associated with a storage component address indicated by the access command. After determining that the cache is full (e.g., of valid data), the memory device may determine to evict information from the first location of the cache. In some cases, the memory device may determine to evict information from the first location of the cache based on the address pointer (e.g., as described with reference to FIG. 3) pointing to a cache address corresponding to the first location. Additionally or alternatively, the memory device may determine to evict the information from the first location of the cache based on a value indicated by the hit count field of the first location. The operations of 615 may be performed according to the methods described herein. In some examples, aspects of the operations of 615 may be performed by a cache eviction manager as described with reference to FIG. 5.

At 620, the memory device may receive, from the first address of the storage component, a second code word of a second size based on determining to evict the information in the first location from the cache. That is, the memory device may determine to update the second code word stored at the first address of the storage component based on evicting the first code word that is indicated as dirty (e.g., by a dirty field). In some cases, the first code word is a different size than the second code word. For example, the first code word may be 64 bytes while the second code word is 128 bytes. As a result, a portion of the second code word may be correct (e.g., updated) while a second portion of the code word may be incorrect (e.g., not updated, dirty). The operations of 620 may be performed according to the methods described herein. In some examples, aspects of the operations of 620 may be performed by a storage component manager as described with reference to FIG. 5.

At 625, the memory device may merge the first code word stored in the first portion of the first location of the cache with the second code word to obtain a third code word of the second size. In some cases, the third code word may be an updated version of the second code word. For example, a first code word may correspond to a lower 128 bytes of the 256 byte code word. Here, merging the first code word with the second code word may include concatenating an upper 128 bytes of the second code word with the first code word to generate the 256 byte third code word. The operations of 625 may be performed according to the methods described herein. In some examples, aspects of the operations of 625 may be performed by a code word merger as described with reference to FIG. 5.

At 630, the memory device may write the third code word to the first address of the storage component. In some cases, the third code word may include portions that are identical to the second code word previously stored at the first address of the storage component. For example, the third code word may be 64 bytes and may be generated (e.g., at 625) by concatenating a 32 byte first code word with the lower 32 bytes of the second code word. Here, the memory device may only write the portion of the third code word that is different than the second code word. For example, if a lower portion of the third code word is identical to a lower portion of the second code word, the memory device may suppress a second half of the write operation, thus preserving the lower portion of the second code word at the first address of the storage component. In another example, if an upper portion of the third code word is identical to an upper portion of the second code word, the memory device may suppress a first half of the write operation, thus preserving the upper portion of the second code word at the first address of the storage component. The operations of 630 may be performed according to the methods described herein. In some examples, aspects of the operations of 630 may be performed by a storage component manager as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving, from a host device, a first code word of a first size for storing in a first address of a storage component, storing the first code word in a first portion of a first location of a cache, and determining to evict information in the first location of the cache. The apparatus may further include features, means, or instructions for receiving, from the first address of the storage component, a second code word of a second size based on determining to evict the information in the first location from the cache, merging the first code word stored in the first portion of the first location of the cache with the second code word to obtain a third code word of the second size, and writing the third code word to the first address of the storage component.

Some examples of the method 600 and the apparatus described herein may further include operations, features, means, or instructions for generating a first error checking value associated with the first code word, and storing the first error checking value in the first portion of the first location of the cache, where storing the first code word in the first portion of the first location may be based on storing the first error checking value in the first portion of the first location.

Some cases of the method 600 and the apparatus described herein may further include operations, features, means, or instructions for performing an error checking process on the first code word stored in the first location of the cache based on the first error checking value stored in the first location of the cache to obtain a corrected first code word for merging with the second code word, where merging the first code word stored in the first portion of the first location with the second code word may be based on performing the error checking process.

Some instances of the method 600 and the apparatus described herein may further include operations, features, means, or instructions for receiving a fourth code word of the first size for storing in the first address of the storage component, generating a second error checking value associated with the fourth code word, and storing the fourth code word and the second error checking value in a second portion of a second location of the cache.

Some examples of the method 600 and the apparatus described herein may further include operations, features, means, or instructions for performing an error checking process on the second code word based on a first error checking value received from the first address of the storage component to obtain a corrected second code word for merging with the first code word stored in the first portion of the first location of the cache, and generating a second error checking value based on the third code word, where merging the first code word stored in the first portion of the first location of the cache with the second code word may be based on generating the second error checking value.

In some cases of the method 600 and the apparatus described herein, the storage component may include operations, features, means, or instructions for determining that a subset of the third code word associated with a cycle of a burst for a channel of the set of channels may have a same set of bit values as a corresponding subset of the second code word, and suppressing a write operation associated with the channel for the cycle of the burst based on the determining that the subset of the third code word may have the same set of bit values as the corresponding subset of the second code word, where writing the third code word to the first address may be based on suppressing the write operation.

In some instances of the method 600 and the apparatus described herein, the channel may be associated with a memory chip of the storage component.

Some examples of the method 600 and the apparatus described herein may further include operations, features, means, or instructions for receiving, from the host device, a logical address associated with the first code word, and determining the first address based on the logical address, the first size, and the second size.

Some cases of the method 600 and the apparatus described herein may further include operations, features, means, or instructions for concatenating the first code word with a portion of the second code word of the first size to generate the third code word, where merging the first code word stored in the first portion of the first location of the cache with the second code word may be based on concatenating the first code word with the portion of the second code word.

In some instances of the method 600 and the apparatus described herein, the second size may be an integer multiple of the first size.

Some examples of the method 600 and the apparatus described herein may further include operations, features, means, or instructions for receiving, from the host device, a fourth code word of the first size for storing in a second address of the storage component, and storing the fourth code word in a first portion of a second location of the cache with a first indication that the first portion of the second location of the cache contains valid data. The apparatus may further include operations, features, means, or instructions for receiving, from the host device, a fifth code word of the first size for storing in the second address of the storage component, storing the fifth code word in a second portion of the second location of the cache with a second indication that the second portion of the second location of the cache contains valid data, determining to evict information in the second location from the cache, and writing a sixth code word generated from the first and second portions of the second location of the cache to the second address of the storage component based on determining to evict the information in the second location from the cache. In some cases, the writing may be independent of a seventh code word previously stored at the second address of the storage component based on the first and second indications.

Figure 7:
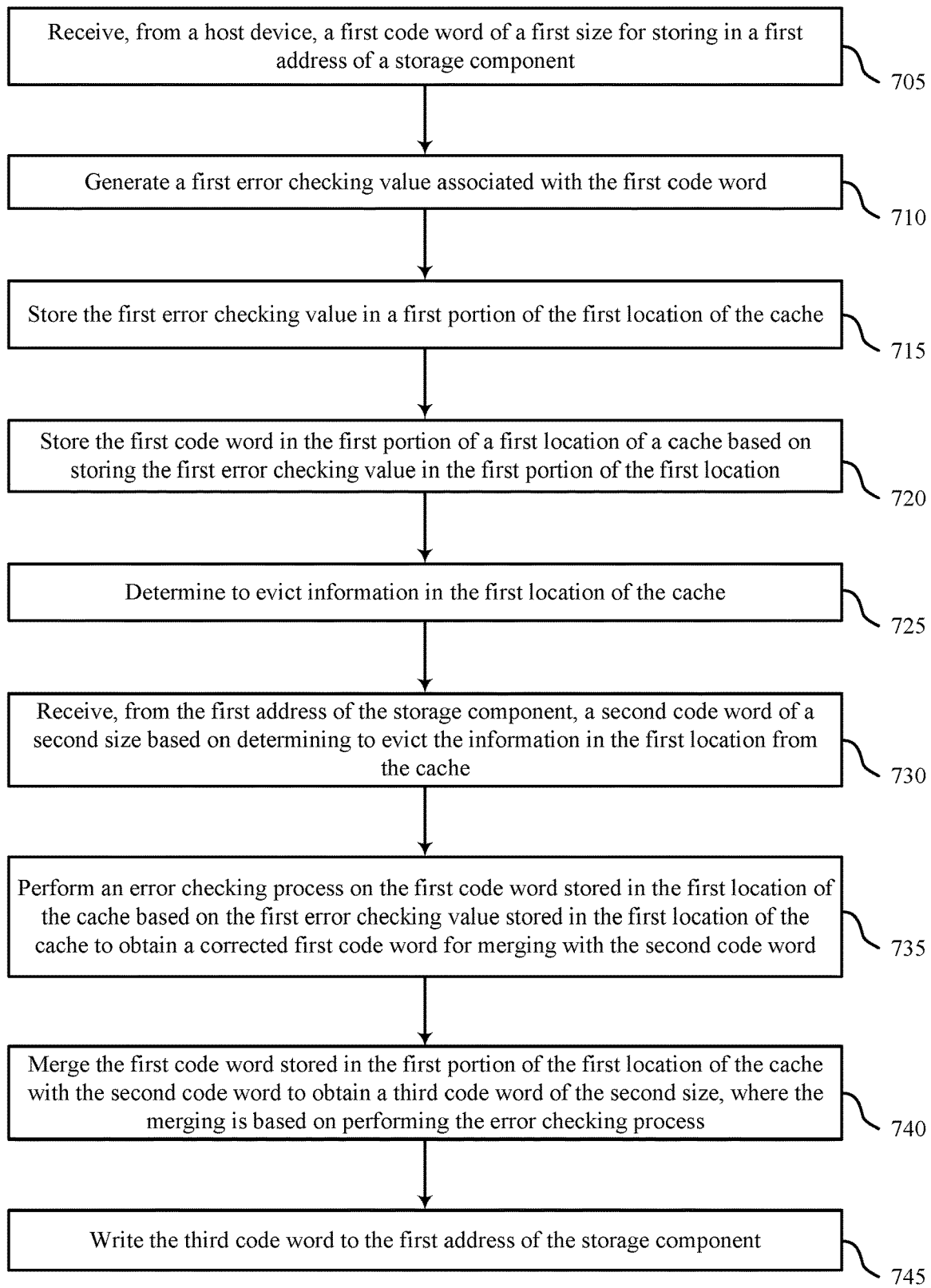

FIG. 7 shows a flowchart illustrating a method or methods 700 that supports methods for supporting mismatched transaction granularities in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive, from a host device, a first code word of a first size for storing in a first address of a storage component. The operations of 705 may be performed according to the methods described herein. In some examples, aspects of the operations of 705 may be performed by a host device manager as described with reference to FIG. 5.

At 710, the memory device may generate a first error checking value associated with the first code word. The operations of 710 may be performed according to the methods described herein. In some examples, aspects of the operations of 710 may be performed by an error checking manager as described with reference to FIG. 5.

At 715, the memory device may store the first error checking value in a first portion of the first location of the cache. The operations of 715 may be performed according to the methods described herein. In some examples, aspects of the operations of 715 may be performed by an error checking manager as described with reference to FIG. 5.

At 720, the memory device may store the first code word in a first portion of a first location of a cache based on storing the first error checking value in the first portion of the first location. The operations of 720 may be performed according to the methods described herein. In some examples, aspects of the operations of 720 may be performed by a cache storage manager as described with reference to FIG. 5.

At 725, the memory device may determine to evict information in the first location of the cache. The operations of 725 may be performed according to the methods described herein. In some examples, aspects of the operations of 725 may be performed by a cache eviction manager as described with reference to FIG. 5.

At 730, the memory device may receive, from the first address of the storage component, a second code word of a second size based on determining to evict the information in the first location from the cache. The operations of 730 may be performed according to the methods described herein. In some examples, aspects of the operations of 730 may be performed by a storage component manager as described with reference to FIG. 5.

At 735, the memory device may perform an error checking process on the first code word stored in the first location of the cache based on the first error checking value stored in the first location of the cache to obtain a corrected first code word for merging with the second code word. The operations of 735 may be performed according to the methods described herein. In some examples, aspects of the operations of 735 may be performed by an error checking manager as described with reference to FIG. 5.

At 740, the memory device may merge the first code word stored in the first portion of the first location of the cache with the second code word to obtain a third code word of the second size. In some cases, the merging may be based on performing the error checking process (e.g., at 735). The operations of 740 may be performed according to the methods described herein. In some examples, aspects of the operations of 740 may be performed by a code word merger as described with reference to FIG. 5.

At 745, the memory device may write the third code word to the first address of the storage component. The operations of 745 may be performed according to the methods described herein. In some examples, aspects of the operations of 745 may be performed by a storage component manager as described with reference to FIG. 5.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a cache coupled with a storage component, each address of the cache including a first portion and a second portion that are each configured to store a data word of a first size. The apparatus may further include a controller coupled with the cache and operable to receive, from a second address of the storage component and based on determining to evict the first code word from the cache, a second code word of a second size, merge the first code word with the second code word to obtain a third code word of the second size, and write the third code word to the second address of the storage component.

In some examples, the controller may further be operable to receive, from a host device, the first code word of the first size for storing in the second address of the storage component, and store the first code word in the first portion of the first address of the cache.

In some cases, the controller may further be operable to generate a first error checking value associated with the first code word, and store the first error checking value in the first portion of the first address of the cache, where storing the first code word in the first portion of the first address may be based on storing the first error checking value in the first portion of the first address.

In some instances, the controller may further be operable to perform an error checking process on the first code word stored in the first address of the cache based on the first error checking value stored in the first address of the cache to obtain a corrected first code word for merging with the second code word, where merging the first code word with the second code word may be based on the corrected first code word.

In some examples, the controller may further be operable to receive a fourth code word of the first size for storing in the second address of the storage component, generate a second error checking value associated with the fourth code word, and store the fourth code word and the second error checking value in the second portion of a third address of the cache.

In some cases, the controller may further be operable to perform an error checking process on the second code word based on a first error checking value received from the second address of the storage component to obtain a corrected second code word for merging with the first code word, and generate a second error checking value based on the third code word, where merging the first code word with the second code word may be based on generating the second error checking value.

An apparatus is described. The apparatus may include a host interface for receiving, from a host device, a first code word of a first size for storing in a first address of a storage component and a cache coupled with the host interface and operable to store the first code word in a first portion of a first location of the cache. The apparatus may further include a cache manager coupled with the cache and the storage component, the cache manager operable to generate an indication of overwriting of the first location of the cache, and a storage interface coupled with the cache and the cache manager. The storage interface may be operable to read a second code word of a second size from the first address of the storage component based on the indication from the cache manager, merge the first portion of the first location of the cache with the second code word to obtain a third code word of the second size, and write the third code word to the first address of the storage component.

Some examples of the apparatus may include an error checking manager coupled with the cache, the error checking manager operable to generate a first error checking value associated with the first code word, and store the first error checking value in the first portion of the first location of the cache, where storing the first code word in the first portion of the first location is based on storing the first error checking value in the first portion of the first location.

In some cases, the error checking manager may be further operable to perform an error checking process on the first code word stored in the first location of the cache based on the first error checking value stored in the first location of the cache to obtain a corrected first code word for merging with the second code word. Further, the storage interface may be further operable to merge the first portion of the first location with the second code word based on the corrected first code word.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    determining to evict a first code word of a first size from a cache coupled with a storage component;
    performing a first error checking process on the first code word of the first size from the cache based at least in part on determining to evict the first code word;
    performing a second error checking process on a second code word of a second size from the storage component based at least in part on determining to evict the first code word;
    merging, after performing the first and second error checking processes, the first code word from the cache with a portion of the second code word from the storage component to obtain a third code word of the second size; and
    writing the third code word to the storage component based at least in part on evicting the first code word from the cache.

2. The method of claim 1, further comprising:
    generating an error checking value associated with the third code word before writing the third code word to the storage component, wherein writing the third code word comprises writing the error checking value to the storage component.

3. The method of claim 1, further comprising:
    determining that the first size is smaller than a threshold size; and receiving the second code word from the storage component based at least in part on determining that the first size is different than the second size, wherein the second error checking process is based at least in part on receiving the second code word.

4. The method of claim 3, wherein the threshold size is equal to the second size.

5. The method of claim 1, further comprising:
reading, from the cache and based at least in part on determining to evict the first code word, a first error checking value for the first code word, wherein the first error checking process is based at least in part on the first error checking value; and
reading, from the storage component and based at least in part on determining to evict the second code word, a second error checking value for the second code word, wherein the second error checking process is based at least in part on the second error checking value.

6. The method of claim 1, further comprising:
determining that the first code word corresponds to a second portion of the second code word and is different than the second portion of the second code word, wherein the first code word is merged with the portion of the second code word based at least in part on determining that the first code word corresponds to, and is different than, the second portion of the second code word.

7. The method of claim 1, further comprising:
correcting an error in the first code word based at least in part on performing the first error checking process and before merging the first code word with the portion of the second code word.

8. The method of claim 1, further comprising:
correcting an error in the second code word based at least in part on performing the second error checking process and before merging the first code word with the portion of the second code word.

9. An apparatus, comprising:
a cache coupled with a storage component and configured to store a first code word of a first size; and
a controller coupled with the cache and operable to cause the apparatus to:
determine to evict the first code word of the first size from the cache;
perform a first error checking process on the first code word of the first size from the cache based at least in part on determining to evict the first code word;
merge, after the first and second error checking processes, the first code word with a portion of the second code word from the storage component to obtain a third code word of the second size; and
write the third code word to the storage component based at least in part on evicting the first code word from the cache.

10. The apparatus of claim 9, wherein the controller is further operable to cause the apparatus to:
generate an error checking value associated with the third code word before writing the third code word to the storage component, wherein writing the third code word comprises writing the error checking value to the storage component.

11. The apparatus of claim 9, wherein the controller is further operable to cause the apparatus to:
determine that the first size is smaller than a threshold size; and
receive the second code word from the storage component based at least in part on determining that the first size is different than the second size, wherein the second error checking process is based at least in part on receiving the second code word.

12. The apparatus of claim 9, wherein the controller is further operable to cause the apparatus to:
read, from the cache and based at least in part on determining to evict the first code word, a first error checking value for the first code word, wherein the first error checking process is based at least in part on the first error checking value; and
read, from the storage component and based at least in part on determining to evict the second code word, a second error checking value for the second code word, wherein the second error checking process is based at least in part on the second error checking value.

13. The apparatus of claim 9, wherein the controller is further operable to cause the apparatus to:
determine that the first code word corresponds to a second portion of the second code word and is different than the second portion of the second code word, wherein the first code word is merged with the portion of the second code word based at least in part on determining that the first code word corresponds to, and is different than, the second portion of the second code word.

14. The apparatus of claim 9, wherein the controller is further operable to cause the apparatus to:
correct an error in the first code word based at least in part on performing the first error checking process and before merging the first code word with the portion of the second code word.

15. The apparatus of claim 9, wherein the controller is further operable to cause the apparatus to:
correct an error in the second code word based at least in part on performing the second error checking process and before merging the first code word with the portion of the second code word.

16. An apparatus, comprising:
a cache manager coupled with a cache and a storage component, the cache manager operable to generate an indication of evicting a first code word of a first size from the cache;
a cache error checking manager coupled with the cache and operable to perform a first error checking process on the first code word of the first size based at least in part on the indication; and
a storage interface coupled with the cache error checking manager and operable to:
perform a second error checking process on a second code word of a second size from the storage component based at least in part on the indication;
perform a second error checking process on a second code word of a second size from the storage component based at least in part on determining to evict the first code word;
merge, after performing the first and second error checking processes, the first code word from the cache with a portion of the second code word from the storage component to obtain a third code word of the second size; and
write the third code word to the storage component based at least in part on evicting the first code word from the cache.

17. The apparatus of claim 16, wherein the storage interface is further operable to:
generate an error checking value associated with the third code word before writing the third code word to the storage component, wherein writing the third code word comprises writing the error checking value to the storage component.

18. The apparatus of claim 16, wherein the cache manager is further operable to:
determine that the first size is smaller than a threshold size, and wherein the storage interface is further operable to:
receive the second code word from the storage component based at least in part on determining that the first size is different than the second size, wherein the second error checking process is based at least in part on reading the second code word.

19. The apparatus of claim 16, wherein the cache error checking manager is further operable to:
receive, from the cache and based at least in part on the indication, a first error checking value for the first code word, wherein the first error checking process is based at least in part on the first error checking value; and
wherein the storage interface is further operable to:
receive, from the storage component and based at least in part the indication, a second error checking value for the second code word, wherein the second error checking process is based at least in part on the second error checking value.

20. The apparatus of claim 16, wherein the storage interface is further operable to:
determine that the first code word corresponds to a second portion of the second code word and is different than the second portion of the second code word, wherein the first code word is merged with the portion of the second code word based at least in part on determining that the first code word corresponds to, and is different than, the second portion of the second code word.

* * * * *